(12) United States Patent
Richards et al.

(10) Patent No.: US 12,540,443 B2
(45) Date of Patent: Feb. 3, 2026

(54) VEGETATION MAINTENANCE SYSTEM

(71) Applicant: Chunqiao Han, Shenzhen (CN)

(72) Inventors: Owen Emanuel Richards, Victoria (AU); Chunqiao Han, Shenzhen (CN)

(73) Assignee: Chunqiao Han, Shenzhen (CN)

( * ) Notice: Subject to any disclaimer, the term of this patent is extended or adjusted under 35 U.S.C. 154(b) by 574 days.

(21) Appl. No.: 18/158,968

(22) Filed: Jan. 24, 2023

(65) Prior Publication Data

US 2023/0157219 A1  May 25, 2023

Related U.S. Application Data

(63) Continuation of application No. PCT/CN2020/105206, filed on Jul. 28, 2020.

(51) Int. Cl.
*E01C 9/00* (2006.01)

(52) U.S. Cl.
CPC .................. *E01C 9/004* (2013.01)

(58) Field of Classification Search
CPC ....... E01C 9/004; E01C 11/223; E03G 1/005; Y02A 10/30
See application file for complete search history.

(56) References Cited

U.S. PATENT DOCUMENTS

| | | | |
|---|---|---|---|
| 8,834,060 B2 * | 9/2014 | Lawry .................... | A01G 29/00 405/53 |
| 9,487,421 B2 * | 11/2016 | Coffman ................. | C02F 3/327 |
| 2005/0100401 A1 | 5/2005 | Urriola et al. | |
| 2013/0213869 A1 * | 8/2013 | Allard .................... | E03F 5/101 210/170.03 |

FOREIGN PATENT DOCUMENTS

| | | |
|---|---|---|
| CN | 201883360 U | 6/2011 |
| CN | 203782519 U | 8/2014 |
| CN | 207314476 U | 5/2018 |
| CN | 108330866 A | 7/2018 |

(Continued)

OTHER PUBLICATIONS

Extended European Search Report issued in corresponding European Application No. 20946734.9, dated Aug. 30, 2023.

(Continued)

*Primary Examiner* — Gary S Hartmann
(74) *Attorney, Agent, or Firm* — AP3 Law Firm PLLC

(57) ABSTRACT

A vegetation maintenance system includes a permeable curb, a water-diversion layer, a water-storage layer, a nutrient layer, and a vegetation-planting trough. The permeable curb is located abutting roadside pavement edge of a road along a road direction. The water-diversion layer is located on a side surface of the permeable curb and is disposed close to a bottom of the permeable curb. The water-storage layer is disposed at one side of the water-diversion layer away from a surface of the road, and is configured to store water. The nutrient layer is disposed at one side of the water-storage layer away from the water-diversion layer, and is configured to provide water, soil, and nutrients for growth of vegetation. The vegetation-planting trough penetrates through the water-diversion layer and the water-storage layer, is embedded in the nutrient layer, and is configured for vegetation planting.

14 Claims, 3 Drawing Sheets

(56) References Cited

FOREIGN PATENT DOCUMENTS

| | | | | |
|---|---|---|---|---|
| CN | 207812613 U | | 9/2018 | |
| CN | 109235182 A | | 1/2019 | |
| CN | 209194274 U | | 8/2019 | |
| CN | 209568327 U | | 11/2019 | |
| CN | 209652665 U | | 11/2019 | |
| CN | 110904772 A | | 3/2020 | |
| CN | 210395596 U | | 4/2020 | |
| CN | 210712413 U | * | 6/2020 | |
| CN | 210714001 U | * | 6/2020 | |
| CN | 116220177 A | * | 6/2023 | ............ E03F 5/0401 |
| CN | 120061458 A | * | 5/2025 | ............... A01G 7/06 |
| KR | 100659768 B1 | | 12/2006 | |
| KR | 101343005 B1 | | 12/2013 | |
| KR | 101375866 B1 | * | 3/2014 | .............. E03F 1/005 |
| KR | 101485001 B1 | * | 1/2015 | .............. E03F 5/103 |
| KR | 102076482 B2 | | 2/2020 | |
| MX | 2016013828 A | | 4/2018 | |

OTHER PUBLICATIONS

Patent examination report 1 issued in corresponding New Zealand Application No. 797676, dated Aug. 9, 2024.
Examination Report No. 1 issued in corresponding Australian Application No. 2020461178, dated Apr. 24, 2024.
First Office Action issued in corresponding Chinese Application No. 202010737882.5, dated Sep. 3, 2021.
Second Office Action issued in corresponding Chinese Application No. 202010737882.5, dated Mar. 21, 2022.
The International Search Report issued in corresponding PCT Application No. PCT/CN2020/105206, mailed Apr. 29, 2021.

* cited by examiner

VEGETATION MAINTENANCE SYSTEM

CROSS-REFERENCE TO RELATED APPLICATIONS

This application is a continuation of International Application No. PCT/CN2020/105206, filed Jul. 28, 2020, the entire disclosure of which is incorporated herein by reference.

TECHNICAL FIELD

This disclosure relates to the field of urban vegetation maintenance, and in particular to a vegetation maintenance system.

BACKGROUND

Through the natural water cycle, rainwater falling onto the ground directly permeates through the soil layers and replenishes groundwater. The soil, after absorbing the rainwater is wet, cool, oxygen and mineral rich. The rainwater works together with other nutrients in the soil to make plants thrive. In modern urban developments, a large amount of land is covered by impervious surfaces (e.g., asphalt roads, cement roads, reinforced cement bridges, buildings, etc.). In these impervious urban environments, the rainwater falling onto the ground can only be diverted to other areas through an underground drainage network system. Thus, the natural water cycle within these urban areas becomes broken and detrimentally interrupted.

In urban developments, man-planted vegetation along a roadside is surrounded by hard, compacted engineered soil and other impervious surfaces. To reduce the risk to civic infrastructure, the vegetation root ball is planted in a shallow hole. The surrounding compacted engineered fill and impermeable materials, significantly limit the natural spread of vegetation root mass. Furthermore, the water, oxygen and nutrients in the soil are also significantly reduced, mostly reflected by the impervious surfaces. As a result, the vegetation, especially a big tree, cannot develop a healthy root mass and subsequently a healthy canopy cover.

Regarding an existing urban rainwater harvesting, storage, and recycling system, rainwater is diverted to a storage system through pipelines from the top of a building, an external wall of the building, a surface of the road, and the like, and then is used for future recycling.

After it rains in a city, the natural water cycle infiltration process cannot occur. Only drainage pit and pipe systems and combined sewers can remove this rainwater. Sewer facilities in most cities are old and not large enough, which can cause serious waterlogging in case of heavy rains. The man-planted vegetation along the roadsides, especially the large trees, require regular manual irrigation and soil maintenance, and many of the large trees also need structural reinforcement or support. As a result, time, labor, money, and water maintenance costs are high, and with poor unhealthy root systems, many trees are susceptible to pathogens, viruses, and collapse.

SUMMARY

A vegetation maintenance system is provided in implementations of the present disclosure. The vegetation maintenance system includes a permeable curb, a water-diversion layer, a water-storage layer, a nutrient layer, and a vegetation-planting trough. The permeable curb is located abutting a roadside pavement edge of a road along a road direction. The water-diversion layer is located on a side surface of the permeable curb and is disposed close to a bottom of the permeable curb. The water-storage layer is disposed at one side of the water-diversion layer away from a surface of the road, and is configured to store water. The nutrient layer is disposed at one side of the water-storage layer away from the water-diversion layer, and is configured to provide water, soil, and nutrients for growth of vegetation. The vegetation-planting trough penetrates through the water-diversion layer and the water-storage layer, is embedded in the nutrient layer, and is configured for vegetation planting.

BRIEF DESCRIPTION OF THE DRAWINGS

In order to illustrate structural features and functions of the present disclosure more clearly, the following detailed description will be made with reference to accompanying drawings and specific implementations.

DETAILED DESCRIPTION OF ILLUSTRATIVE EMBODIMENTS

The following will describe technical solutions of implementations with reference to the accompanying drawings. Apparently, implementations described herein are merely some implementations, rather than all implementations, of the present disclosure. Based on implementations described herein, all other implementations obtained by those of ordinary skill in the art without creative effort shall fall within the protection scope of the present disclosure.

In view of this, a vegetation maintenance system is provided in implementations of the present disclosure. The vegetation maintenance system can simulate a natural water cycle pathway of "natural rainfall, nourishing plants from top to bottom", such that healthy growth of the plants in urban environment is ensured. Furthermore, rainwater can be fully utilized to irrigate vegetation, providing healthy shady canopies. The stored and infiltrated rainwater can cool the soil whilst reducing impacts of flooding and capacities on combined sewers. Maintenance costs can be significantly reduced and prevented effectively.

Figure 1:
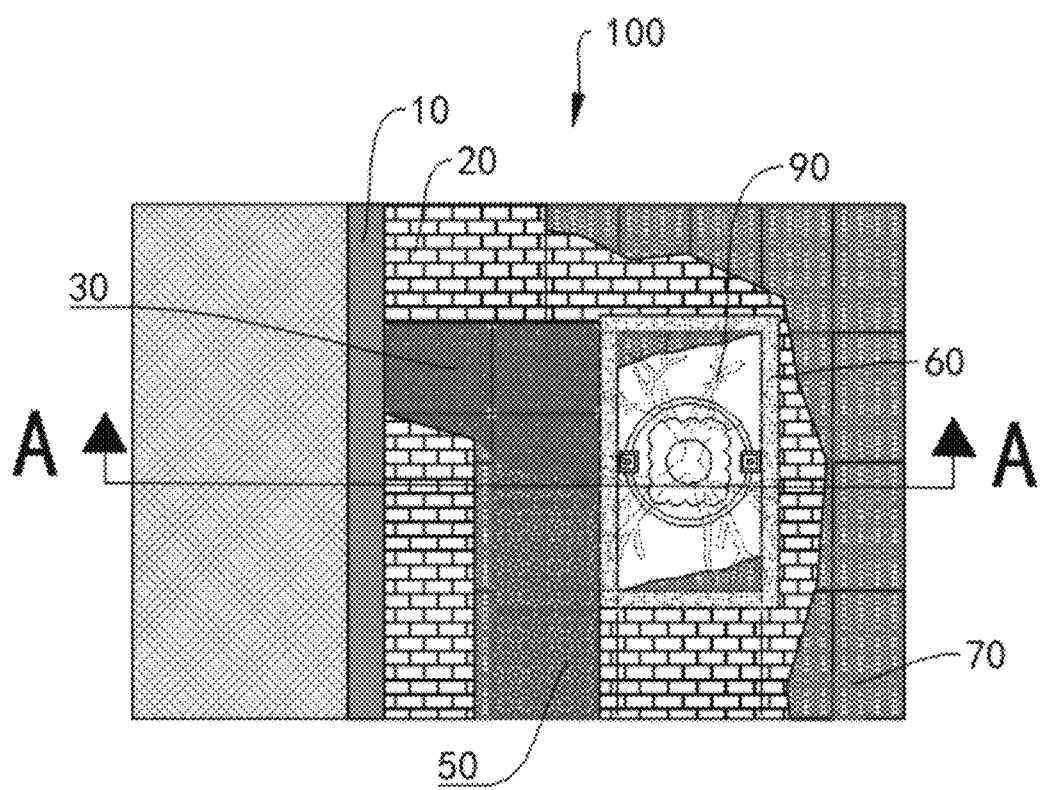
FIG. 1 is a schematic top partial cross-sectional structural diagram of a vegetation maintenance system of an example implementation of the present disclosure.
Figure 2:
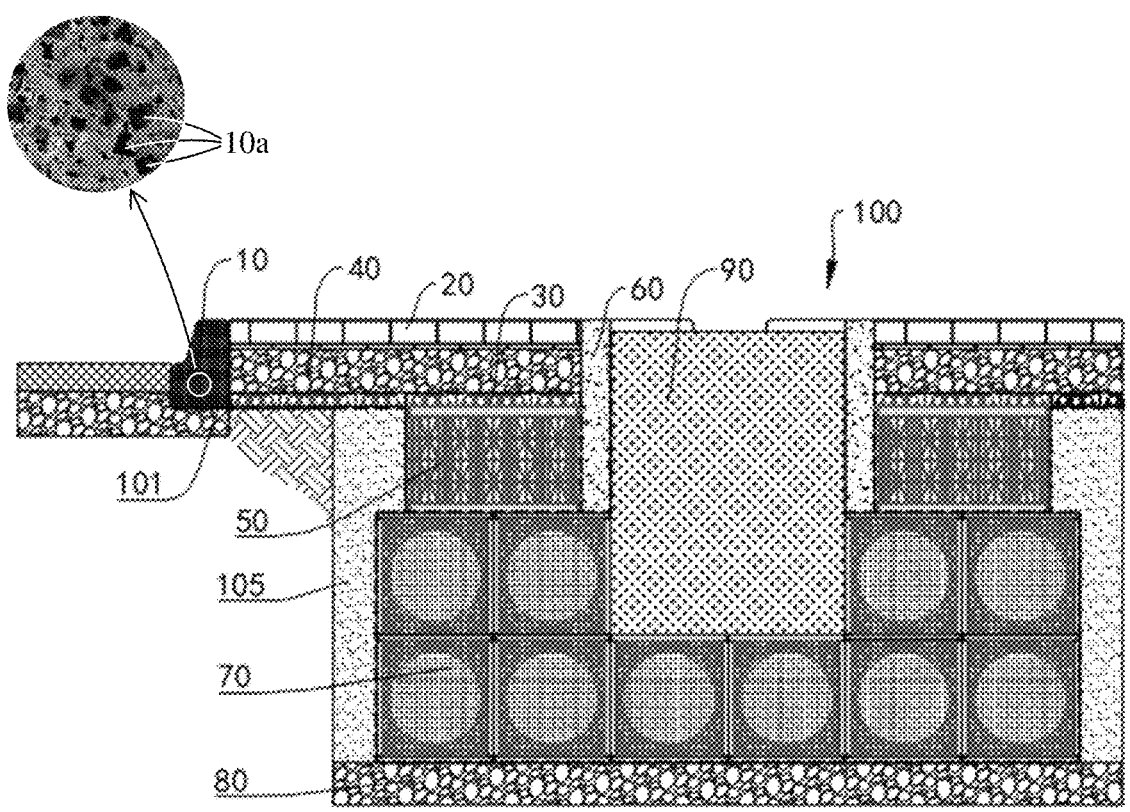
FIG. 2 is a schematic cross-sectional structural diagram of the vegetation maintenance system of the example implementation of FIG. 1, taken along A-A.

Reference can be made to FIG. 1 and FIG. 2, a vegetation maintenance system 100 of implementations in the present disclosure includes a permeable curb 10, a water-division layer 30, a water-storage layer 50, a nutrient layer 70, and a vegetation-planting trough 90. The permeable curb 10 is located abutting a roadside pavement edge of a road along a road direction. The permeable curb 10 is able to continuously allow water to permeate through in all directions in the whole process. The water-division layer 30 is located at a side surface of the permeable curb 10 and is disposed close to a bottom of the permeable curb 10. The water-diversion layer 30 is configured to divert water from roads and pavements into the water-storage layer 50 described below for storage. The water-diversion layer 30 may be made of a recycled engineering plastic. For example, the water-division layer 30 may be made of 90% recycled polypropylene with a surface void ratio of 90% and an internal void ratio of 95%. The water-diversion layer 30 is tough and firm, and has a bearing capacity greater than 235 t/m² when pressed by a vehicle. The water-storage layer 50 is disposed at one side of the water-division layer 30 away from the road, and is configured to store water. The nutrient layer 70 is disposed at one side of the water-storage layer 50 away from the water-division layer 30, and is configured to provide water, soil, and nutrients for growth of vegetation. The vegetation-planting trough 90 penetrates through the water-division layer 30 and the water-storage layer 50, is embedded in the nutrient layer 70, and is configured to plant the vegetation.

In the present disclosure, the vegetation maintenance system 100 is located immediately adjacent to the road. Accumulated water on the road, such as rainwater, quickly permeates into the water-diversion layer 30 via the permeable curb 10, and then is diverted into the water-storage layer 50 for storage. In this way, when it does not rain, the water-storage layer 50 can still provide water for growth of the vegetation in the vegetation-planting trough 90, such that irrigation times of the vegetation are reduced and even manual irrigation is not needed, and the labor costs are reduced. In addition, the accumulated water on a surface of the road can also be drained away in time, so as to prevent the accumulated water on the surface of the road from affecting traffic of vehicles during rainfall. In case of heavy rain, the accumulated water on the surface of the road can also be drained away quickly, so as to prevent a flash flooding. Moreover, in the present disclosure, the water-storage layer 50 of the vegetation maintenance system 100 is disposed above the nutrient layer 70, and the vegetation-planting trough 90 penetrates through the water-storage layer 50 and is embedded in the nutrient layer 70. Therefore, when planting the vegetation, especially a big tree, the entire root zone of the vegetation (top and bottom of the root zone) is surrounded from top to bottom by the water, the soil, and the nutrients in the nutrient layer 70, such that the root zone can fully absorb water, oxygen, and nutrients for thriving.

Specifically, for safety, the permeable curb 10 is usually located at each side of the road. The permeable curb 10 is configured as a permeable structure, such that the rainwater can quickly and directly permeates into the water-division layer 30 through the permeable structure, and then is diverted into the water-storage layer 50 for storage. Optionally, the permeable curb 10 is made of permeable concrete that is formed by mixing permeable cement with sand. The permeable curb 10 defines interconnected holes b0a for connecting the water-division layer 30 with the road, such that water on the road is quickly diverted into the water-storage layer 50 through the water-division layer 30 in case of water accumulation on the road. In other words, with the aid of the interconnected holes b0a, the permeable curb 10 and the road communicate. Due to the void properties of the permeable concrete, the permeable concrete has a very high flow rate for rainwater, whilst ensuring a high durability and strength. Even in case of heavy rain, the rainwater can quickly pass through the permeable curb 10, enter the water-division layer 30, and then quickly enter water-storage layer 50, such that the accumulated water on the surface of the road and the risk of flood-waterlogging damage can be avoided effectively. The permeable cement refers to a new type of cement formed by finely adjusting a proportion of water and binder materials. Unlike traditional cement, the permeable cement contains little or even no sand. Specifically, the permeable curb 10 in the present disclosure has a very high flow rate for rainfall, whilst ensuring a high durability and strength, with a void ratio of 15%-25% and a water permeability of 125 L/m²-330 L/m² per minute.

In some implementations, the permeable curb 10 has a thickness of 50 mm-300 mm, such as 50 mm, 80 mm, 100 mm, 150 mm, 200 mm, 250 mm, 280 mm, 300 mm, etc. The permeable curb 10 has a height of 50 mm-500 mm, such as 50 mm, 80 mm, 100 mm, 150 mm, 200 mm, 250 mm, 280 mm, 300 mm, 350 mm, 400 mm, 450 mm, 500 mm, etc.

Optionally, the water-division layer 30 may have a water-diversion structure and be made of a recycled engineering material, such as 90% recycled polypropylene. The water-division layer 10 has a surface void ratio of 90% and an internal void ratio of 95%, and has a bearing capacity greater than 235 t/m² when pressed by the vehicle. The water-division layer 30 may be composed of multiple water-diversion structures. A single water-diversion structure has a height of 40 mm-60 mm, such as 40 mm, 45 mm, 50 mm, 52 mm, 55 mm, 58 mm, 60 mm, etc.; has a length of 450 mm-600 mm, such as 450 mm, 480 mm, 500 mm, 520 mm, 550 mm, 580 mm, 600 mm, etc.; and has a width of 500 mm-700 mm, such as 500 mm, 520 mm, 550 mm, 600 mm, 630 mm, 670 mm, 700 mm, etc.

Optionally, the water-storage layer 50 may have a water-storage structure and be made of a recycled engineering material. For example, the water-storage layer 50 is made of 85% recycled polypropylene with a void ratio of 95%. More specifically, the water-storage layer 50 may be a water-storage frame. The water-storage frame can allow a large amount of rainwater to pass through at one side of the water-storage frame adjacent to the water-diversion layer 30. A surface of the water-storage frame adjacent to the nutrient layer 70 and a surface of the water-storage frame adjacent to the vegetation-planting trough 90 are semi-permeable. Water stored in the water-storage frame can slowly permeate through a side surface (i.e., a surface adjacent to the vegetation-planting trough 90) of the water-storage frame, so as to be supplied to the vegetation in the vegetation-planting trough 90; or the water stored in the water-storage frame can slowly permeate through a bottom (i.e., a surface adjacent to the nutrient layer 70) of the water-storage frame to enter the vegetation-planting trough 70 and then enter the vegetation-planting trough 90, so as to be supplied to the vegetation in the vegetation-planting trough 90. In addition, the nutrients of the nutrient layer 70 can be better transported to the vegetation-planting trough 90 to be supplied to the vegetation.

Figure 3:
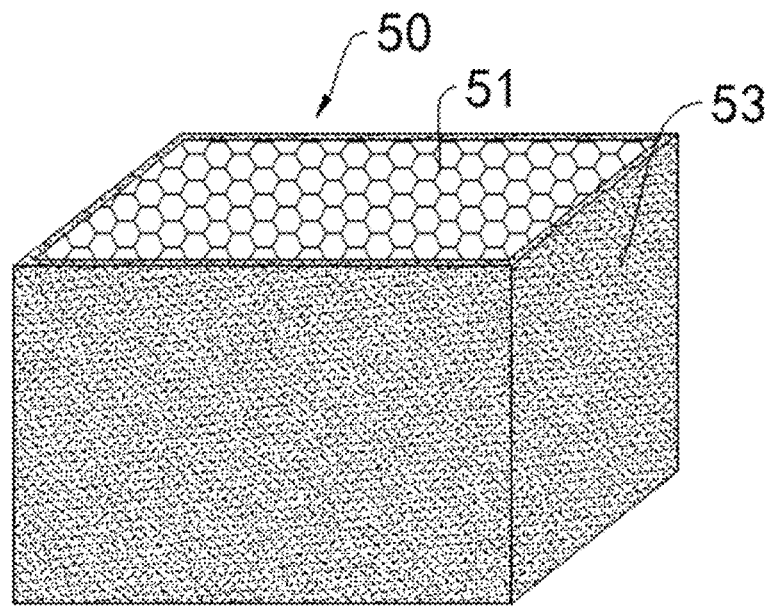
FIG. 3 is a schematic structural diagram of a water-storage layer of an example implementation of the present disclosure.

Reference can be made to FIG. 3. In a specific implementation, the water-storage layer 50 includes a first frame body 51 and a semi-permeable layer 53 which allow water to pass freely. The semi-permeable layer 53 is disposed around the first frame body 51 and disposed on a surface of the first frame body 51 away from the water-division layer 30, and the semi-permeable layer 53 is slowly permeable, such that water in the water-storage layer 50 slowly permeates into the nutrient layer 70 and the vegetation-planting trough 90, and the water for growth of the vegetation is supplied. Specifically, a rate of water permeating through the semi-permeable layer 53 is slower than a rate of water permeating through the permeable curb 10. The first frame body 51 may be made of, but is not limited to, a material such as polypropylene with a relatively great hardness. The semi-permeable layer 53 may be, but is not limited to, a semi-permeable geotextile. In this way, the water-storage layer 50 is simpler in structure and easier to be manufactured, and manufacturing costs are reduced. The first frame body 51 may include multiple first sub-frames, and the multiple first sub-frames are stacked and/or arranged side by side to constitute the first frame body, such that the size of the water-storage layer 50 can be adjusted according to the size of the vegetation maintenance system 100.

In some implementations, each first sub-frame body has a height of 400 mm-500 mm, such as 400 mm, 420 mm, 440 mm, 460 mm, 480 mm, 500 mm, etc.; has a length of 650 mm-800 mm, such as 650 mm, 680 mm, 700 mm, 720 mm, 750 mm, 780 mm, 800 mm, etc.; has a width of 350 mm-450 mm, such as 350 mm, 380 mm, 400 mm, 420 mm, 440 mm, 450 mm, etc.; and has a bearing capacity greater than 24.2 t/m². In a specific implementation, the first sub-frame has the height of 440 mm, the length of 715 mm, and the width of 400 mm, and can hold 120 liters of water.

Figure 4:
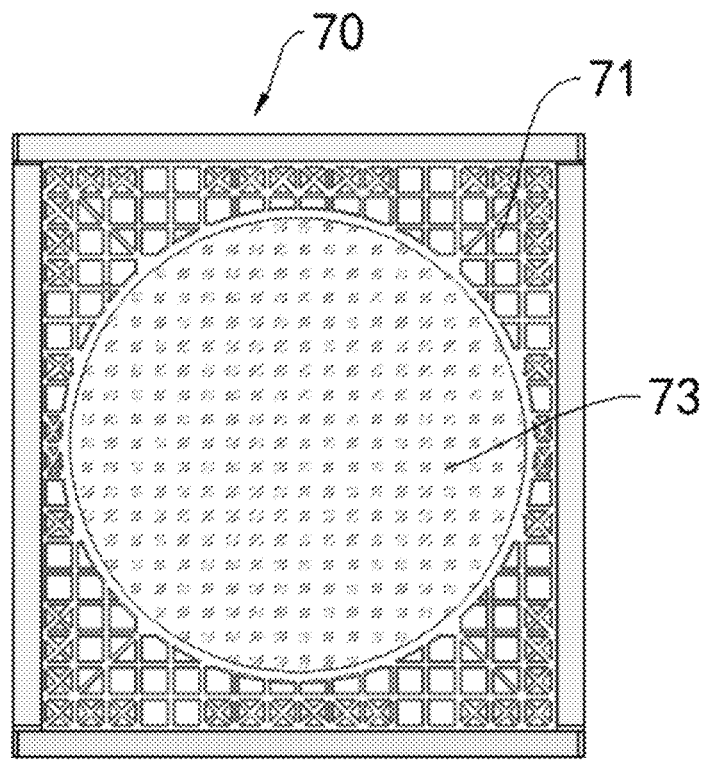
FIG. 4 is a schematic structural diagram of a nutrient layer of an example implementation of the present disclosure.

Reference can be made to FIG. 4. Specifically, in some implementations, the nutrient layer 70 includes a second frame body 71, and the soil and the nutrients 73 which are filled in the second frame body 71. The nutrients include, but are not limited to, nutrients such as nutrient soil and fertilizers for the growth of the vegetation. The second frame body 71 is made of 85% recycled polypropylene with a void ratio of more than 95%. The second frame body 71 is tough and firm, and has a bearing capacity greater than 65 t/m².

When it rains, a large amount of water is stored in the water-storage layer 50. When it does not rain, the water stored in the water-storage layer 50 is slowly released and is supplied to the vegetation in vegetation-planting trough 90, and nutrients and water are supplied to the vegetation through the nutrient layer 70, such that manual irrigation times of the vegetation can be minimized and even no manual irrigation is needed, labor costs are reduced, and survival rate and lifespans of trees along a road can be improved.

The second frame body 71 may include multiple second sub-frames, and the multiple second sub-frames are stacked and/or arranged side by side to constitute the second frame body 71, such that the size of the nutrient layer 70 can be adjusted according to the size of the vegetation maintenance system 100.

In some implementations, each second sub-frame has a height of 300 mm-450 mm, such as 300 mm, 350 mm, 380 mm, 400 mm, 420 mm, 450 mm, etc.; has a length of 550 mm-750 mm, such as 550 mm, 580 mm, 600 mm, 620 mm, 650 mm, 680 mm, 700 mm, 750 mm, etc.; and has a width of 550 mm-750 mm, such as 550 mm, 580 mm, 600 mm, 620 mm, 650 mm, 680 mm, 700 mm, 750 mm, etc. In a specific implementation, the first sub-frame body has the height of 360 mm, the length of 600 mm, and the width of 600 mm.

Reference can be made to FIG. 2 again. In some implementations, the vegetation maintenance system 100 in the present disclosure further includes a man-made pavement 20. The man-made pavement 20 is located at one side of the water-division layer 30 away from the water-storage layer 50. Specifically, the man-made pavement 20 may be a sidewalk pavement, and the water-division layer 30 and the water-storage layer 50 are disposed below the man-made pavement 20, such that an arrangement of the water-division layer 30 and the water-storage layer 50 needs no additional pavement space. In some implementations, the man-made pavement may be located at one side of the vegetation-planting trough 90, or located at two sides of the vegetation-planting trough 90, or located around a periphery of the vegetation-planting trough 90. Specifically, the man-made pavement 20 has a thickness of 50 mm-300 mm, such as 50 mm, 70 mm, 90 mm, 10 mm, 120 mm, 150 mm, 180 mm, 200 mm, 250 mm, 300 mm, etc.

In some implementations, the man-made pavement 20 may be a permeable pavement, such as bricks that are arranged in an array with a certain gap in between. By adopting the permeable pavement, rainwater falling onto the man-made pavement 20 can be fully utilized, and the rainwater can better permeate into the water-storage layer 50. In addition, the man-made pavement 20 may have a structure the same as the permeable curb 10.

In other implementations, the man-made pavement 20 may be an impermeable pavement, such as concrete. The impermeable pavement makes the pavement firmer and more durable.

Optionally, in some implementations, the vegetation maintenance system 100 in implementations of the present disclosure further includes a first support layer 40. The first support layer 40 is permeable. The first support layer 40 is located between the water-division layer 30 and the man-made pavement 20, and is configured to surround a periphery of the vegetation-planting trough 90. Specifically, the first support layer 40 may be, but is not limited to, a backfill layer such as gravel or sand, which can better integrate man-made structures (e.g., buildings, bridges, roads, etc.) into native soil environment. The first support layer 40 cannot only prevent the man-made pavement 20 from being sunk and damaged due to being pressed and trampled by vehicles and pedestrians for a long time, but also allow rainwater to permeate through, flow into the water-division layer 30, and finally enter the water-storage layer 50 for storage. Specifically, the first support layer 40 has a thickness of 300 mm-600 mm, such as 300 mm, 350 mm, 380 mm, 400 mm, 420 mm, 450 mm, 480 mm, 500 mm, 520 mm, 550 mm, 580 mm, 600 mm, etc.

Optionally, in some implementations, the vegetation maintenance system 100 in implementations of the present disclosure further includes an impermeable member 101. The impermeable member 101 is impermeable. The impermeable member 101 is disposed on a surface of the permeable curb 10 away from the surface of the road. In addition, the impermeable member 101 also covers part of a surface of the water-division layer 30 away from the surface of the road. In some implementations, the impermeable member 101 also covers a surface of the permeable curb 10 in contact with the road, so as to prevent water from permeating to the other side of the road. By disposing the impermeable member 101 below the permeable curb 10, accumulated water on an impermeable surface of the road can better pass through the permeable curb 10 to enter the water-division layer 30, and then permeate into the water-storage layer 50 for storage. The impermeable member 101 has a thickness of 5 mm-20 mm, such as 5 mm, 8 mm, 10 mm, 12 mm, 15 mm, 18 mm, and 20 mm.

Reference can be made to FIG. 2 again. Optionally, in some implementations, the vegetation maintenance system 100 in implementations of the present disclosure further includes an isolating member 60. The isolating member 60 is disposed between the water-division layer 30 and the vegetation-planting trough 90, and between the water-storage layer 50 and the vegetation-planting trough 90. Specifically, the isolating member 60 may be made of reinforced concrete, and may have a cement structure or other impermeable structures. The isolating member 60 is like a wall when building a house, and defines a safe and stable space for plants to grow. The isolating member 60 can prevent the man-made pavement 20 disposed above the water-diversion layer 30 from being damaged due to roots of vegetation in a shallow layer of the vegetation-planting trough 90 spreading towards the water-division layer 30 and the water-storage layer 50.

Optionally, in some implementations, the vegetation maintenance system 100 in the present disclosure further includes a second support layer 80. The second support layer 80 is disposed at one side of the nutrient layer 70 away from the water-storage layer 50. Specifically, the second support layer 80 may be, but is not limited to, a backfill layer such as gravel and gravel, which can better integrate man-made structures (such as buildings, bridges, roads, etc.) into the native soil environment. The second support layer 80 is configured to support the nutrient layer 70, and is also configured to isolate the nutrient layer 70 from deep ground, such that the nutrient layer 70 has a better capacity for storing water and nutrients. Specifically, the second support layer 60 has a thickness of 300 mm-600 mm, such as 300 mm, 350 mm, 380 mm, 400 mm, 420 mm, 450 mm, 480 mm, 500 mm, 520 mm, 550 mm, 580 mm, 600 mm, etc.

Optionally, in some implementations, the vegetation maintenance system 100 in implementations of the present disclosure further includes a protective layer 105. The protective layer 105 is disposed around the water-storage layer 50 and the nutrient layer 70, and is located between the second support layer 80 and the water-division layer 30. Specifically, the protective layer 105 may be, but is not limited to, a sand layer. The protective layer 105 can prevent water and nutrients from permeating out of the water-storage layer 50 and the nutrient layer 70, prolong storage time of the water and the nutrients in the water-storage layer 50 and the nutrient layer 70, and better integrate the man-made structures (such as buildings, bridges, roads, etc.) into the native soil environment.

The foregoing implementations are merely some implementations of the present disclosure. The protection scope of the present disclosure is not limited thereto. Those skilled in the art can easily think of various equivalent modifications or substitutions within the technical scope disclosed in the present disclosure, and these modifications or substitutions shall be fall in the scope of protection of the present disclosure. Therefore, the protection scope of the present disclosure shall be subject to the protection scope of the claims.

What is claimed is:

1. A vegetation maintenance system, comprising:
    a permeable curb located abutting a roadside pavement edge of a road along a road direction;
    a water-diversion layer located on a side surface of the permeable curb and disposed close to a bottom of the permeable curb;
    a water-storage layer disposed at one side of the water-diversion layer away from a surface of the road, and configured to store water;
    a nutrient layer disposed at one side of the water-storage layer away from the water-diversion layer, and configured to provide water, soil and nutrients for growth of vegetation; and
    a vegetation-planting trough penetrating through the water-diversion layer and the water-storage layer, embedded in the nutrient layer, and configured for vegetation planting.

2. The vegetation maintenance system of claim 1, wherein the water-storage layer comprises a first frame body and a semi-permeable layer that allow water to pass freely, the semi-permeable layer is disposed around the first frame body and disposed on a surface of the first frame body away from the water-diversion layer, and the semi-permeable layer is slowly permeable.

3. The vegetation maintenance system of claim 2, wherein the permeable curb is made of permeable concrete, and the permeable curb defines interconnected holes for communicating the water-diversion layer with the road.

4. The vegetation maintenance system of claim 2, wherein the nutrient layer comprises a second frame body, and soil and nutrients that are filled in the second frame body.

5. The vegetation maintenance system of claim 4, wherein the permeable curb is made of permeable concrete, and the permeable curb defines interconnected holes for communicating the water-diversion layer with the road.

6. The vegetation maintenance system of claim 1, further comprising a pavement, wherein the pavement is located at one side of the water-diversion layer away from the water-storage layer.

7. The vegetation maintenance system of claim 6, further comprising a first support layer, wherein the first support layer is permeable, and the first support layer is located between the water-diversion layer and the pavement and is configured to surround a periphery of the vegetation-planting trough.

8. The vegetation maintenance system of claim 7, wherein the permeable curb is made of permeable concrete, and the permeable curb defines interconnected holes for communicating the water-diversion layer with the road.

9. The vegetation maintenance system of claim 6, wherein the permeable curb is made of permeable concrete, and the permeable curb defines interconnected holes for communicating the water-diversion layer with the road.

10. The vegetation maintenance system of claim 1, wherein the permeable curb is made of permeable concrete, and the permeable curb defines interconnected holes for communicating the water-diversion layer with the road.

11. The vegetation maintenance system of claim 10, further comprising an impermeable member disposed on a surface of the permeable curb away from the surface of the road.

12. The vegetation maintenance system of claim 1, further comprising an isolating member, wherein the isolating member is disposed between the water-diversion layer and the vegetation-planting trough, and between the water-storage layer and the vegetation-planting trough.

13. The vegetation maintenance system of claim 7, further comprising a second support layer disposed at one side of the nutrient layer away from the water-storage layer.

14. The vegetation maintenance system of claim 13, further comprising a protective layer, wherein the protective layer is disposed around the water-storage layer and the nutrient layer, and is located between the second support layer and the water-diversion layer.

* * * * *